(12) United States Patent
Ruppert et al.

(10) Patent No.: US 11,505,310 B2
(45) Date of Patent: Nov. 22, 2022

(54) FLOW BODY FOR A VEHICLE WITH A COMPRESSIBLE SKIN

(71) Applicant: Airbus Operations GmbH, Hamburg (DE)

(72) Inventors: Bernd Ruppert, Hamburg (DE); Volker Robrecht, Hamburg (DE)

(73) Assignee: AIRBUS OPERATIONS GmbH, Hamburg (DE)

( * ) Notice: Subject to any disclaimer, the term of this patent is extended or adjusted under 35 U.S.C. 154(b) by 943 days.

(21) Appl. No.: 16/219,011

(22) Filed: Dec. 13, 2018

(65) Prior Publication Data
US 2019/0193841 A1    Jun. 27, 2019

(30) Foreign Application Priority Data
Dec. 21, 2017  (DE) .......................... 102017130989.6

(51) Int. Cl.
*B64C 23/00* (2006.01)
*B64C 21/10* (2006.01)
(Continued)

(52) U.S. Cl.
CPC ............ *B64C 21/10* (2013.01); *B64C 23/005* (2013.01); *B32B 5/18* (2013.01); *B32B 27/065* (2013.01); *B32B 2266/06* (2013.01); *B32B 2305/022* (2013.01); *B32B 2307/51* (2013.01); *B32B 2307/538* (2013.01); *B32B 2307/724* (2013.01); *B32B 2605/18* (2013.01); *B64C 2230/08* (2013.01)

(58) Field of Classification Search
CPC ....... B64C 21/00; B64C 21/10; B64C 23/005; B64C 2230/08; B64C 3/20; B64C 3/26
See application file for complete search history.

(56) References Cited

U.S. PATENT DOCUMENTS 3,544,417 A * 12/1970 Corzine .................. E04C 2/243
                                                                    428/104
3,585,953 A *  6/1971 Kramer ................... B64C 21/10
                                                                    114/67 R
(Continued)

FOREIGN PATENT DOCUMENTS

CH        707831 A2    9/2014
EP      2955108 A1   12/2015
(Continued)

*Primary Examiner* — Richard R. Green
*Assistant Examiner* — Michael A. Fabula
(74) *Attorney, Agent, or Firm* — Nixon & Vanderhye P.C.

(57) ABSTRACT

A flow body for a vehicle having a flow surface, as well as a skin system attached to the flow surface is proposed. The skin system has a top layer and a foam arrangement positioned between the flow surface and the top layer, wherein the top layer includes an elastic, surface-like material, wherein the foam arrangement includes a first layer of an elastic, compressible open cell foam, wherein the foam arrangement is bonded to the top layer. The skin system has a static shape in an unloaded state, in which the shape defines an outer surface geometry that directly follows the geometry of the respective flow surface, and the skin system has a deflected shape when the flow body is subjected to turbulent air flow. The deflected shape at least temporarily compresses the foam arrangement.

17 Claims, 2 Drawing Sheets

(51) Int. Cl.
*B32B 5/18* (2006.01)
*B32B 27/06* (2006.01)

(56) References Cited

U.S. PATENT DOCUMENTS

| | | | | |
|---|---|---|---|---|
| 3,708,385 | A * | 1/1973 | Immethun | B32B 5/18 |
| | | | | 428/119 |
| 4,687,691 | A * | 8/1987 | Kay | B29C 44/1266 |
| | | | | 428/73 |
| 5,133,516 | A * | 7/1992 | Marentic | B29C 59/022 |
| | | | | 244/130 |
| 5,901,928 | A | 5/1999 | Raskob, Jr. | |
| 6,375,120 | B1 * | 4/2002 | Wolnek | B32B 5/28 |
| | | | | 244/119 |
| 8,389,104 | B2 * | 3/2013 | Day | E04C 2/36 |
| | | | | 428/153 |
| 8,470,425 | B2 * | 6/2013 | Day | B32B 5/24 |
| | | | | 428/53 |
| 8,800,915 | B2 * | 8/2014 | Gerber | B64C 21/06 |
| | | | | 244/53 B |
| 10,000,277 | B2 * | 6/2018 | Tiwari | B32B 3/266 |
| 2014/0332631 | A1 * | 11/2014 | Rawlings | B32B 7/12 |
| | | | | 244/130 |
| 2015/0096305 | A1 | 4/2015 | Morgan et al. | |
| 2016/0137292 | A1 * | 5/2016 | Teich | B64C 3/20 |
| | | | | 244/130 |

FOREIGN PATENT DOCUMENTS

| | | | |
|---|---|---|---|
| WO | WO-9808677 A1 * | 3/1998 | ............. B32B 27/40 |
| WO | 2012092286 A1 | 7/2012 | |
| WO | 2016083913 A1 | 6/2016 | |

\* cited by examiner

FLOW BODY FOR A VEHICLE WITH A COMPRESSIBLE SKIN

CROSS-REFERENCE TO PRIORITY APPLICATION

This application claims the benefit of, and priority to, German patent application number DE 102017130989.6, filed Dec. 21, 2017. The content of the referenced application is incorporated by reference herein.

TECHNICAL FIELD

Embodiments of the subject matter described herein relate generally to a flow body for a vehicle having at least one flow surface, as well as a vehicle having such a flow body.

BACKGROUND

Influencing the flow resistance, i.e. the aerodynamic drag, is one of the key factors for increasing the efficiency of a vehicle. Depending on the type of vehicle there are different types of drag components, that need to be considered. For example, in an aircraft particularly the lift-induced drag, the parasitic drag as well as the wave drag may be of importance.

One of the main aims for the optimization of flow surfaces of an aircraft lies in the reduction of regions, where turbulent flow occurs. For this, many different measures are known, depending on the location and size of these turbulent flow regions. For example, it is known to include riblets on a flow surface to reduce drag. Also, it is known to include flow guides that support a certain change of flow direction or other counter-measures for eliminating of turbulent flow or wake phenomena. Furthermore, attempts to provide rough and shark-like surface structures on larger flow surfaces are known to reduce turbulent flow regions. Still further, active means for laminarization of a flow are known, which are based on suctioning air from a certain flow region or blowing air into a flow region in order to reattach a flow.

All of these measures have advantages for their intended applications. However, active flow control means require distinct modifications of the respective vehicle. Structures that provide a certain roughness or flow guides in the form of riblets may be subjected to wear. It may therefore be beneficial to have access to a still further system or apparatus that is able to improve the flow on the flow surface in an alternative way.

BRIEF SUMMARY

Hence, it is an object of the disclosure to propose an alternate solution for optimizing the flow resistance on a flow body of a vehicle.

This object is met by a flow body having the features of independent claim 1. Advantageous embodiments and further improvements may be gathered from the sub claims and the following description.

A flow body for a vehicle is proposed. The flow body has at least one flow surface, which is subjectable to a flow surrounding the vehicle, as well as a skin system attached to the at least one flow surface of a vehicle. The skin system comprises a top layer, and a foam arrangement positioned between the at least one flow surface and the top layer, wherein the top layer comprises an elastic, surface-like material, wherein the foam arrangement comprises at least a first layer of an elastic, compressible open cell foam, wherein the foam arrangement is at least in a section bonded to the top layer, wherein the skin system is adapted for having a static shape in an unloaded state, in which the shape defines an outer surface geometry that directly follows the geometry of the respective flow surface, and wherein the skin system is adapted for having a deflected shape if the flow body is subjected to an at least partially turbulent air flow, in which deflected shape the top layer at least in a region of an occurring turbulence at least temporarily compresses the foam arrangement.

Consequently, the flow body has a flow surface that is equipped with an additional skin. The skin, which faces into the surrounding of the flow body and thus is subjectable to an airflow, has the characteristics described in the following.

A core component is provided by the elastic, compressible open cell foam. The first foam layer is made from a solid, reversibly deformable material, which forms a plurality of interconnected hollow cells. The cells each comprise an inner space surrounded by a shell. Due to the open structure of the cells, their inner space is in fluid communication with neighboring cells or the exterior of the foam. Hence, given the elastic material of the foam, the cells can be deformed by a force acting on them. By the deformation, the cells release air that is trapped in the inner space. After removing the force, the cells revert to their original shapes and receive air in their inner spaces again.

The foam serves for locally dampening turbulent flow effects. At locations of turbulent flow, vortices having a flow vector component that is not parallel to the top layer may be present. These press onto the top layer. Due to the flexibility of the top layer as well as the compressibility of the foam underneath, this leads to compressing the foam. Thus, by assuming this deflected shape, the flow is dampened and is at least partially converted to a laminar flow. After the compression of the foam, it reverts back to its original shape, if the force that lead to the compression disappears. Hence, the skin system reverts to the static shape.

This principle has some similarities with the skin of whales and dolphins. The skin of these typically comprise several layers with different characteristics. These include, from the outside to the inside, the epidermis, the dermis, a fat layer and subcutaneous musculature. The epidermis is the outermost layer, which protects internal tissues and may be exceedingly thick over the general body surfaces. For example, a thickness of 2.5 to 3 mm has been found in Finback whales. The epidermis can be understood as being composed of two layers, which is the basal layer directly above the dermis, and the external stratum corneum, which is composed of dead, keratin-filled cells that have migrated outward from the basal layer. The epidermis itself has no blood supply. The dermis comprises a papillary layer, which comprises elongate and pointed papillae, which are wedged into the epidermis. The papillae are penetrated by blood vessels. The fat layer furthermore comprises collagenous fibers. Both the dermis and the fat layer have a significantly greater thickness than the epidermis. At locations of highest water resistance, the epidermis is locally pressed inwardly and thus acts on the layers below. The combination of the epidermis that is penetrated by the papillae, as well as the dermis and the soft fat layer leads to a distinct dampening function for whirls of the water flow along the skin, thereby leading to a reduction of friction.

Hence, the skin system attached to the flow surface of the flow body aims at reducing the aerodynamic resistance of a vehicle, which travels through air. The at least one first foam layer acts in dampening turbulences in the air flow around the flow surface.

In advantageous embodiment, the top layer is foil-like. The top layer should be responsible for providing a smooth and continuous outer surface for the flow body that is equipped with the skin system. As it is a main aim to limit the weight of every component of an aircraft as the main example of a vehicle, the thickness of the top layer should be as low as possible. The use of a foil or a foil-like element allows to clearly limit the weight. However, it should be taken care that the top layer is sufficiently rigid under all operation conditions. In a commercial aircraft, these may include large temperature, pressure and velocity ranges of the flow that passes along the top layer.

In a still further advantageous embodiment, the top layer is made from a plastics material. The plastics material may comprise any suitable elastomeric, thermoplastic or duromeric plastics material. When selecting the material for the top layer, it is to be considered to use a material that is sufficiently soft, such that local turbulences lead to a slight deformation of the foam arrangement positioned underneath. However, it should have a sufficient tensile strength. If applicable, also reinforcement fibers may be included into the top layer to increase the tensile strength. These may include copper wires or graphene, which may also lead to an integrated lightning protection.

The top layer may at least in a region comprise a perforation or an air-permeable section 17. The perforations or the air-permeable sections should be sufficiently large or capable of allowing a pressure compensation to avoid a destruction of the skin system. For example, if the skin system according to the disclosure is to be included into a commercial aircraft, distinct changes in pressure act on the skin system. For example, in cruise flight, the ambient pressure may be as little as a quarter of the ambient pressure on ground. Further, due to varying temperatures on ground, the skin system may be exposed to high temperatures, which would lead to an expansion of the skin system, if no perforations or other means for compensating the pressure are present. An air-permeable section may be realized by a membrane, which is adapted for allowing a pressure compensation, but prevents water to penetrate the foam arrangement. This may be realized by expanded polytetrafluoroethylene (ePTFE), which is known as an air-permeable, waterproof membrane. It may also be possible to provide the whole top layer with such an air-permeable material.

As an alternative, also a base layer (see further below) may at least in a region comprise a perforation or an air-permeable section. For example, the base layer may cover a dedicated opening in the flow surface, above which the perforations or the air-permeable section is placed. The pressure compensation is conducted in this region at a side facing away from the general flow over the flow surface.

As a still further alternative, the foam arrangement may be in fluid communication with an interior of the vehicle or the flow body, in order to conduct a pressure compensation. Hence, any overpressure or underpressure in the foam arrangement is compensatable through the fluid communication with an interior of the vehicle. Perforations or other air-permeable means are therefore not absolutely required.

The foam arrangement may further comprise at least a second layer of an elastic, compressible open cell foam, wherein the at least one first layer is arranged between the at least one second layer and the top layer and wherein the compressibility of the at least one first layer of the foam arrangement is higher than the compressibility of the at least one second layer. The including of the additional foam layer having a higher rigidity, i.e., a lower compressibility, leads to better reflecting the characteristics of a whale skin as mentioned above.

However, the foam arrangement may also comprise at least a second layer of an elastic, compressible open cell foam, wherein the at least one first layer is arranged between the at least one second layer and the top layer and wherein the compressibility of the at least one first layer of the foam arrangement is lower than the compressibility of the at least one second layer. Hence, the second layer compresses more strongly than the at least one first layer and, as a tendency, the first layer is pressed into the second layer on a larger surface.

The at least one second layer may comprise a plurality of elongate protrusions, which extend away from the at least one second layer into the at least one first layer. These elongate protrusions simulate the papillae between the dermis and the epidermis of the whale skin and may increase the dampening effect.

In this regard, the protrusions may extend at least through a third of the thickness of the at least one first layer. Hence, at least a third of the at least one first layer is penetrated by these protrusions, which have a measurable effect on the dampening effect.

Still further, the protrusions may extend at least through half of the thickness of the at least one first layer. This substantially corresponds to the composition of a whale skin.

Further, the at least one first layer may have an inhomogeneous compressibility, in which the compressibility changes in the thickness direction. This allows to tailor the dampening characteristics to the requirements of the respective location. For example, the compressibility at a region near the top layer may be larger than in location further away from the top layer.

In another exemplary embodiment, the top layer has a rough surface. Preferably, the surface may include a roughness produced by a riblet structure, which reduced the surface friction of the flow body.

However, it may also be suitable to provide a top layer having a smooth surface. This may be beneficial in several locations on the flow body.

In an advantageous embodiment, the skin system has a base layer between the at least one flow surface and the foam arrangement, which is at least in a section bonded to the foam arrangement. The base layer may be a foil-like element as well. It may be elastic or flexible. The base layer allows a simpler connection of the skin system to the respective flow surface and may be handled like a carpet. Furthermore, the flow surface has a better protection against corrosion effects.

The disclosure further relates to a vehicle, having at least one flow body with a flow surface according to the above description. In an exemplary embodiment, the vehicle may be an aircraft, and in particular a commercial aircraft.

In this regard, the skin system may be arranged in a region of a wing, a stabilizer or a fuselage, where a transition between a laminar flow and a turbulent flow is to be expected. In the case of the fuselage it may be possible to reduce the amount of insulation inside the fuselage, as the foam arrangement place on the outside of the fuselage leads to thermal insulation as well.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
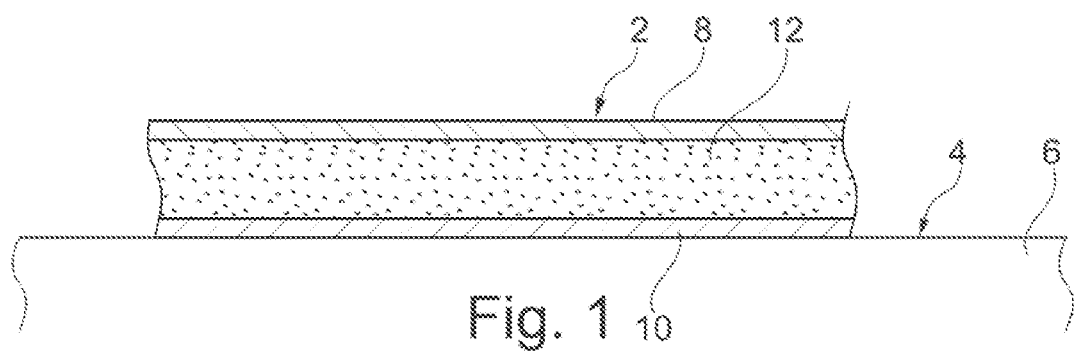
FIGS. 1-3 show different exemplary embodiments of a flow body having a skin system according to the disclosure.

FIG. 1 shows a skin system 2 arranged on a flow surface 4 of a flow body 6. The skin system comprises a top layer 8, a base layer 10 as well as a foam arrangement 12 arranged therebetween. The top layer 8 is exemplarily realized in a foil-like manner and thus comprises a rather low thickness. It is imaginable that the top layer 8 comprises a thickness of clearly less than a millimeter and may be manufactured by a plastics material. The top layer 8 is sufficiently flexible to allow a deformation of the top layer 8 in order to compress the foam arrangement 12.

The foam arrangement 12 in this case includes of a single (first) layer of an open-cell, compressible foam. The foam arrangement 12 may be manufactured from a plastics material, for example polyurethane. The compressibility may be constant. However, also the compressibility may be inhomogeneous along the thickness direction.

The base layer 10 constitutes the base for the skin system 2, which is bondable to the flow surface 4. Again, this layer may be made from a plastics material.

The combination of these three layers allows local vortices to compress the foam arrangement 12, in order to dampen the vorticity of the flow along the top surface 8. This leads to at least partially laminarizing the flow, which in turn leads to a reduction of aerodynamic resistance.

Figure 2:
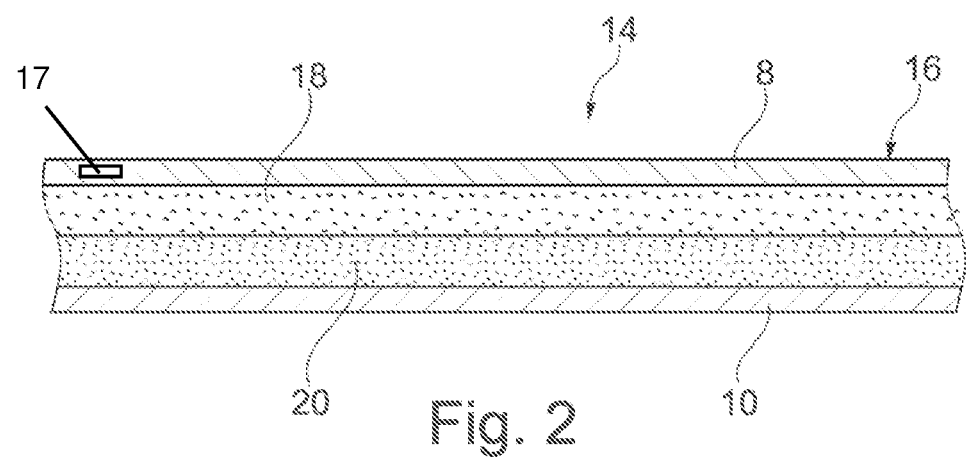

In FIG. 2, a skin system 14 is shown, which has the same top layer 8 as well as the same base layer 10, but comprises a foam arrangement 16 that includes a first layer 18 and a second layer 20. In this example, the first layer 18 comprises a larger compressibility than the second foam layer 20.

Figure 3:
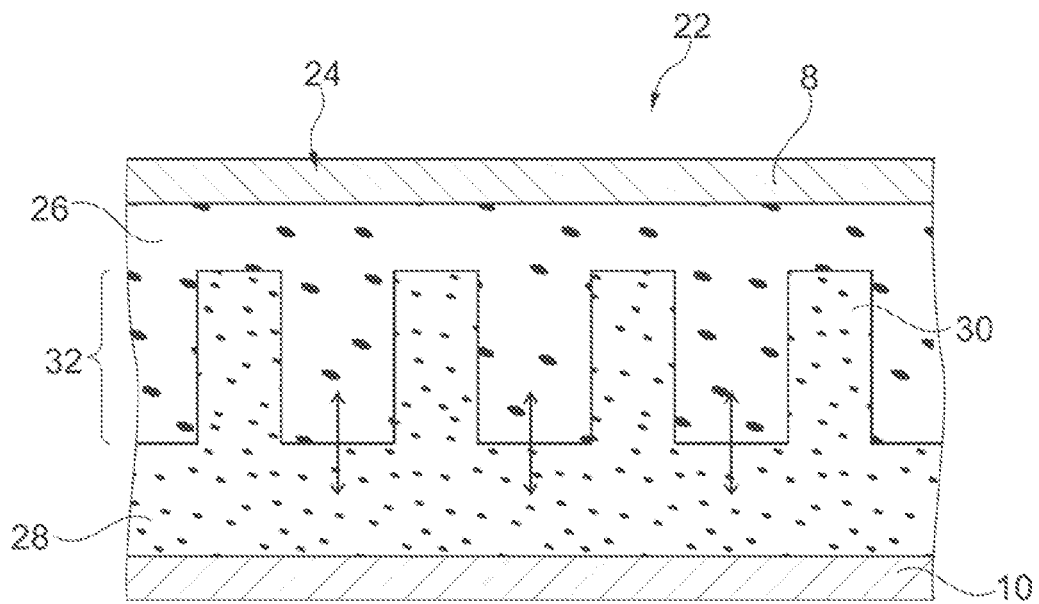

In a still further exemplary embodiment, as skin system 22 is shown in FIG. 3. Here, a top layer 8 as well as a base layer 10 are present, as in the other examples. A foam arrangement 24 comprises a first layer 26 as well as a second layer 28. The second layer 28 comprises a plurality of elongate protrusions 30, which are directed towards the top layer 8. The first foam layer 26 is therefore penetrated by the protrusions 30 and thus there is a transition region 32, where both foam layers 26 and 28 intersect, i.e. are present. These elongate protrusions 30 simulate the above-mentioned papillae of the dermis of a whale skin, which reach into the epidermis. Hence, the skin system 22 has a distinct similarity of the construction of a whale skin and allows an improved dampening of turbulent flow that occurs on the top layer 22.

Figure 4:
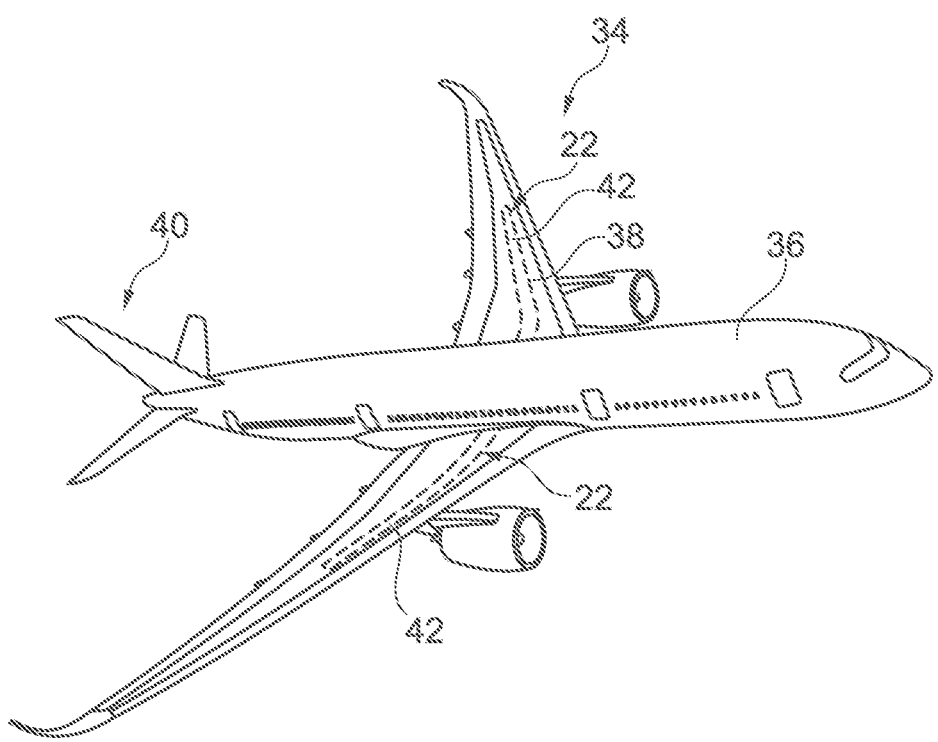
FIG. 4 shows an aircraft with a wing that is partially equipped with a skin system according to the disclosure.

Finally, FIG. 4 shows a vehicle in form of an aircraft 34, which has a fuselage 36, wings 38 as well as stabilizers 40. Exemplarily, the wings 38 are partially equipped with a skin system 22 in form of a belt 42 or stripe, that extends along a region, where a transition between turbulent flow and laminar flow is to be expected.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A flow body for a vehicle, comprising:
   at least one flow surface, which is subjectable to a flow surrounding the vehicle, and
   a skin system attached to one of the at least one flow surface, wherein the skin system comprises:
   a top layer;
   a foam arrangement positioned between the at least one flow surface and the top layer;
   wherein the top layer comprises an elastic material;
   wherein the foam arrangement comprises at least one layer of an elastic, compressible open cell foam;
   wherein the foam arrangement is bonded at least in a section to the top layer;
   wherein the skin system has a static shape in an unloaded state, in which the shape defines an outer surface geometry that directly follows the geometry of the respective flow surface;
   wherein the skin system has a deflected shape when the flow body is subjected to an at least partially turbulent air flow, in which deflected shape the top layer at least in a region of an occurring turbulence at least temporarily compresses the foam arrangement.

2. The flow body of claim 1, wherein the top layer is foil-like.

3. The flow body of claim 1, wherein the top layer comprises a plastic material.

4. The flow body of claim 1, wherein the top layer at least in a region comprises an air-permeable section.

5. The flow body of claim 1, wherein:
the foam arrangement further comprises at least a second layer of an elastic, compressible open cell foam;
the first layer is arranged between the second layer and the top layer; and
compressibility of the first layer of the foam arrangement is higher than compressibility of the second layer.

6. The flow body of claim 5, wherein the second layer comprises a plurality of elongate protrusions extending into the first layer.

7. The flow body of claim 6, wherein the plurality of elongated protrusions extend at least through a third of the total thickness of the first layer.

8. The flow body of claim 6, wherein the plurality of elongated protrusions extend at least through half of the total thickness of the first layer.

9. The flow body of claim 1, wherein the first layer has an inhomogeneous compressibility, in which the compressibility changes in the thickness direction.

10. The flow body of claim 1, wherein the top layer has a rough surface.

11. The flow body of claim 1, wherein the top layer has a smooth surface.

12. The flow body of claim 1, wherein the skin system comprises a base layer between the at least one flow surface and the foam arrangement, which is bonded to the foam arrangement at least in a section.

13. A vehicle, having the flow body according to claim 1.

14. The vehicle according to claim 13, wherein the vehicle is an aircraft.

15. The vehicle according to claim 14, wherein the skin system is arranged in a region of a wing, a stabilizer or a fuselage of the aircraft, where a transition between a laminar flow and a turbulent flow is to be expected.

16. A flow body for a vehicle, comprising:
at least one flow surface, which is subjectable to a flow surrounding the vehicle, and
a skin system attached to one of the at least one flow surface, wherein the skin system comprises:
a top layer;
a foam arrangement positioned between the at least one flow surface and the top layer;
wherein the top layer comprises an elastic material;
wherein the foam arrangement comprises at least two layers of an elastic compressible open cell foam;
wherein the foam arrangement is bonded at least in a section to the top layer;
wherein the skin system has a static shape in an unloaded state, in which the shape defines an outer surface geometry that directly follows the geometry of the respective flow surface;
the foam arrangement further comprises at least a second layer of an elastic, compressible open cell foam;
the first layer is arranged between the second layer and the top layer; and
compressibility of the first layer of the foam arrangement differs from the compressibility of the second layer,
wherein the second layer comprises a plurality of elongate protrusions extending into the first layer, and
wherein the skin system has a deflected shape when the flow body is subjected to an at least partially turbulent air flow, in which deflected shape the top layer at least in a region of an occurring turbulence at least temporarily compresses the foam arrangement.

17. The flow body for a vehicle of claim 16, wherein the compressibility of the first layer of the foam arrangement is higher than compressibility of the second layer.

* * * * *